United States Patent
Mitchell et al.

(10) Patent No.: US 7,086,874 B2
(45) Date of Patent: Aug. 8, 2006

(54) SEAT TRACK COVER AND METHOD WITH EMBEDDED CONDUITS FOR SEAT-TO-SEAT ELECTRICAL CONNECTIVITY

(75) Inventors: Bradley J Mitchell, Snohomish, WA (US); Kevin S Callahan, Shoreline, WA (US); Daniel J Howard, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/090,863

(22) Filed: Mar. 25, 2005

(65) Prior Publication Data

US 2005/0215095 A1    Sep. 29, 2005

Related U.S. Application Data

(60) Provisional application No. 60/557,044, filed on Mar. 27, 2004.

(51) Int. Cl.
*H01R 25/00* (2006.01)

(52) U.S. Cl. .................................. 439/110; 244/118.6

(58) Field of Classification Search ............... 439/110, 439/593, 577; 244/118.5, 118.6, 129.1
See application file for complete search history.

(56) References Cited

U.S. PATENT DOCUMENTS

| 4,428,078 A | 1/1984 | Kuo |
| 4,763,360 A | 8/1988 | Daniels et al. |
| 4,853,555 A | 8/1989 | Wheat |
| 6,601,798 B1 | 8/2003 | Cawley |
| 6,817,894 B1* | 11/2004 | Sanner et al. ............... 439/535 |
| 2005/0211835 A1* | 9/2005 | Henley et al. ............. 244/118.6 |
| 2005/0230543 A1* | 10/2005 | Laib et al. ................ 244/118.5 |
| 2005/0230548 A1* | 10/2005 | Mitchell et al. .......... 244/129.1 |
| 2005/0247820 A1* | 11/2005 | Feist et al. ................ 244/118.6 |
| 2005/0258676 A1* | 11/2005 | Mitchell et al. ........ 297/216.13 |
| 2006/0016944 A1* | 1/2006 | Howard et al. ........... 248/188.1 |

* cited by examiner

*Primary Examiner*—Tulsidas C. Patel
*Assistant Examiner*—Phuongchi Nguyen
(74) *Attorney, Agent, or Firm*—Harness Dickey & Pierce P.L.C.

(57) ABSTRACT

A seat track system for conducting electricity between spaced apart seats, such as between passenger seats of an aircraft passenger cabin, comprising a conductive tube assembly and a housing. The conductive tube assembly includes a conductive inner layer having a first conductive portion and a second conductive portion that is structurally independent of the first conductive portion. The first and the second portions define a socket. The tube assembly further includes a dielectric outer layer that is elastic so as to exert a biasing force on the conductive inner layer to urge the first portion and the second portion together. The housing is operable to receive the conductive tube assembly and support the tube assembly between the first and the second seats. The socket is operable to receive a conductive member that mates with the conductive inner layer to conduct electricity to and from the conductive tube assembly.

19 Claims, 7 Drawing Sheets

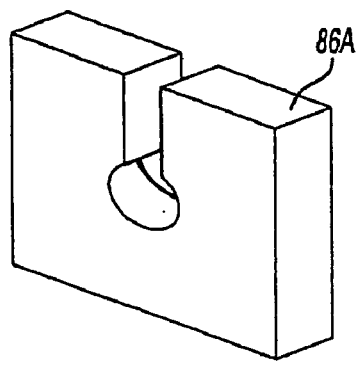
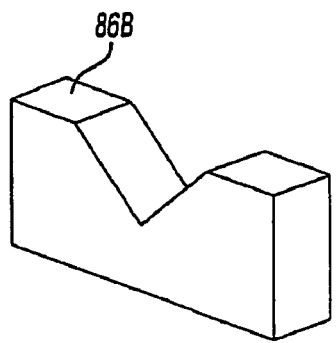
Fig-8A                Fig-8B
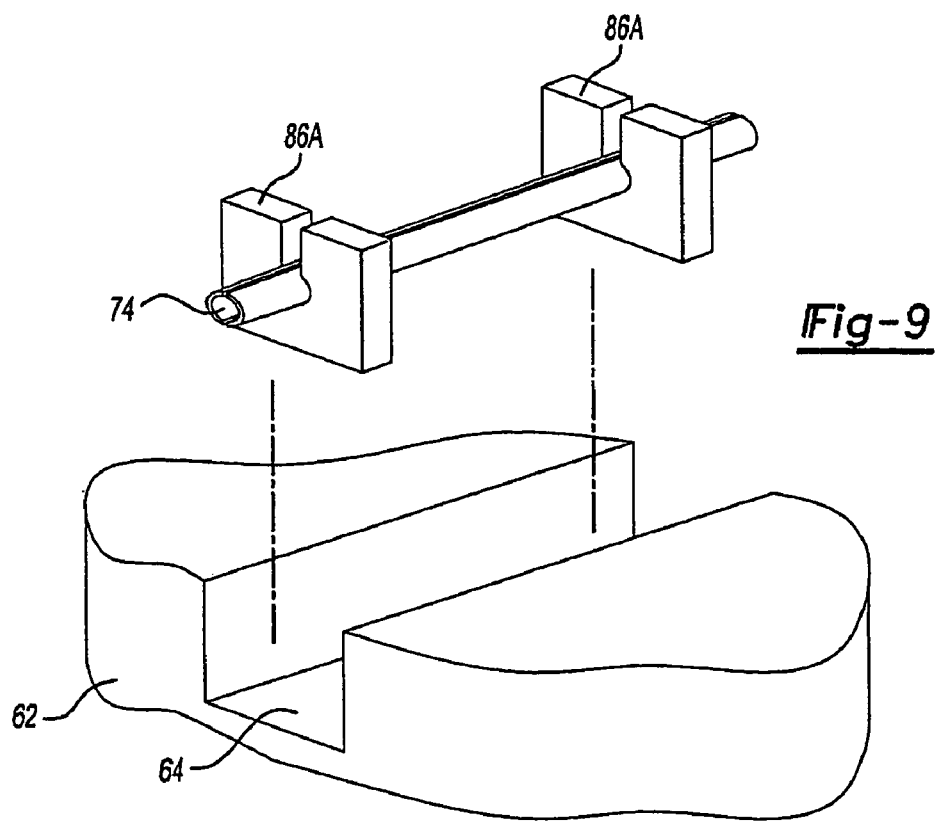
Fig-9

SEAT TRACK COVER AND METHOD WITH EMBEDDED CONDUITS FOR SEAT-TO-SEAT ELECTRICAL CONNECTIVITY

CROSS-REFERENCE TO RELATED APPLICATIONS

This application claims the benefit of U.S. provisional application No. 60/557,044 filed on Mar. 27, 2004, which is incorporated herein by reference.

The following applications are also incorporated by reference herein: provisional application Ser. No. 60/556,826 filed on Mar. 27, 2004; provisional application Ser. No. 60/556,823 filed on Mar. 27, 2004; provisional application Ser. No. 60/556,747 filed on Mar. 27, 2004; provisional application Ser. No. 60/556,748, filed on Mar. 27, 2004; U.S. application Ser. No. 10/810,324 filed on Mar. 27, 2004; U.S. application Ser. No. 10/898,729 filed on Jul. 23, 2004; U.S. application Ser. No. 10/936,004 filed on Sep. 8, 2004; U.S. application Ser. No. 10/983,906 filed on Nov. 8, 2004; and U.S. application Ser. No. 10/943,035 filed on Sep. 16, 2004.

FIELD OF THE INVENTION

The present invention relates to seat track systems used in mobile platforms. In particular, the present invention relates to a seat track apparatus and method for providing power and/or data to spaced apart passenger seats mounted on a seat track in a mobile platform, such as an aircraft.

BACKGROUND OF THE INVENTION

Commercial aircraft passengers are increasingly demanding in-flight entertainment (IFE) and electrical power outlets to operate various electronic devices, such as laptop computers, at their seats. To provide the passenger with such features, electrical power and data must be delivered to each seat. Conventionally, power and data are delivered to aircraft passenger seats via numerous cables that, during aircraft assembly, are laid out in position on the floor of the aircraft passenger cabin. A portion of the cables is positioned beneath a covering, such as the seat track cover, and a portion that includes connectors to the seats is left exposed to connect with the yet to be installed seat groups containing each passenger seat.

During installation of the seat groups, the seat groups must be carried in over the exposed wires. Taking care to avoid the exposed wires increases both the complexity of the operation and the amount of time required to install the seats. Once the seats are installed, installers must crawl along the floor of the aircraft to manually attach each wire to each seat group. This process is cumbersome and time consuming. Further, in order to change the configuration of the seats or to replace the seats, an installer must again crawl along the floor, disconnect the wiring from each group, and maneuver the seats around the exposed wiring. Still further, in order to change the position of the seat groups, the aircraft must be re-wired so that the wiring will reach the seats in their new positions. As would be expected, re-wiring an aircraft is a costly and time consuming process.

In view of the foregoing, it is desirable to provide an improved device for delivering power to aircraft passenger seat groups that will eliminate the need to separately connect each seat group to an individual power or data cable and the need to re-wire the power cables when the seat configuration is changed.

SUMMARY OF THE INVENTION

A seat track system and method operable to distribute power/data to ports associated with spaced apart seats mounted to a seat track within a mobile platform. The seat track system delivers power/data to any number of select locations within the mobile platform, such as to seats. In particular, the seat track system transfers power/data between adjacent seat groups by engaging connectors provided at the base of adjacent seat legs.

In one embodiment, the present invention provides for a system for conducting electricity between a first point and a second point, such as between passenger seats of an aircraft passenger cabin, comprising a conductive tube assembly and a housing. The conductive tube assembly includes a conductive inner layer having a first conductive portion and a second conductive portion that is structurally independent of the first conductive portion. The first and the second portions define a socket. The tube assembly further includes a dielectric outer layer that is elastic so as to exert a biasing force on the conductive inner layer to urge the first portion and the second portion together. The housing is operable to receive the conductive tube assembly and support the tube assembly between the first and the second points. The socket is operable to receive a conductive member that mates with the conductive inner layer to conduct electricity to and from the conductive tube assembly.

In another embodiment, the present invention provides for a system for conducting electricity between seats of a mobile platform. The system generally comprises a cover and a conductive tube assembly. The cover is operable to extend between a first receptacle of a first seat and a second receptacle of a second seat. The conductive tube assembly is mounted to the cover and extends at least substantially an entire length of the cover. The conductive tube assembly has a conductive inner layer having a first conductive portion and a second conductive portion that is structurally independent of the first conductive portion, the first and second portions define a socket. The tube assembly also include a dielectric outer layer that is elastic so as to exert a biasing force on the conductive inner layer to urge the first portion and the second portion together. The socket is operable to receive a first conductive member of the first receptacle and a second conductive member of the second receptacle to conduct electricity between the first seat and the second seat.

In a further embodiment the present invention provides for a method for distributing electricity between a first point and a second point. The method includes the following steps: securing a conductive tube assembly within a housing; positioning the housing between the first point and the second point such that a first end of the conductive tube assembly is at least proximate to the first point and a second end of the conductive tube assembly is at least proximate to the second point, the conductive tube assembly having a conductive inner layer having a first conductive portion and a second conductive portion that is structurally independent of the first conductive portion, the first and the second portions defining a socket, and a dielectric outer layer that is elastic so as to exert a biasing force on the conductive inner layer to urge the first portion and the second portion together; inserting a first conductive member of the first point within the socket at the first end of the conductive tube assembly; and inserting a second conductive member of the second point within the socket at the second end of the conductive tube assembly to provide an electrical connection between the first point and the second point using the conductive tube assembly.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIGS. 8A and 8B are perspective views of two spacer blocks used to support the conduit assemblies; and FIG. 9 is a perspective view showing use of the spacer blocks to support a conduit assembly within a receiver of the seat track cover.

DETAILED DESCRIPTION OF THE PREFERRED EMBODIMENTS

The following description of the preferred embodiments is merely exemplary in nature and is in no way intended to limit the invention, its application, or uses.

Figure 1:
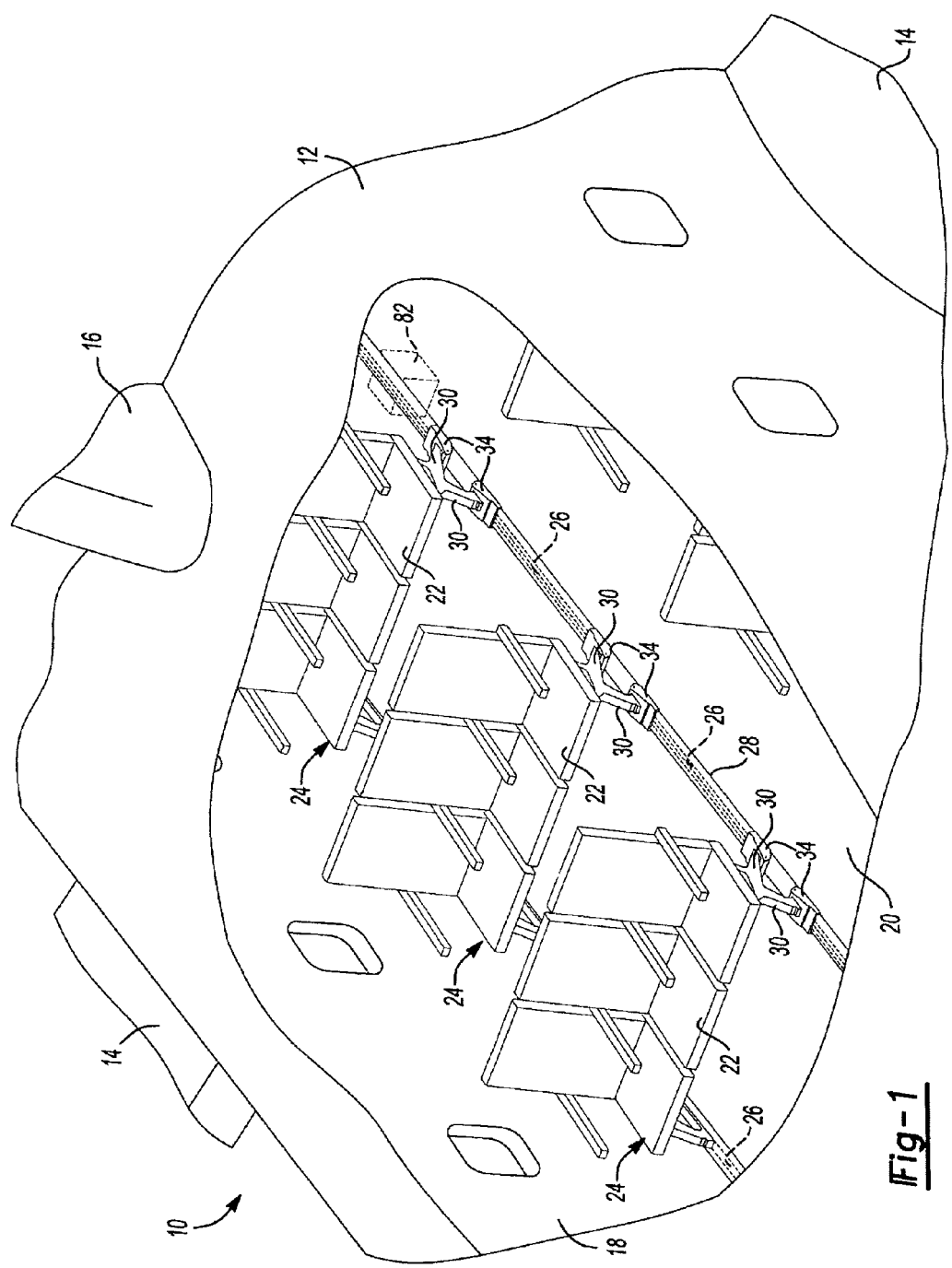
FIG. 1 is a partially cut-away view of an aircraft showing the aircraft passenger cabin outfitted with the seat track cover of the present invention.

With initial reference to FIG. 1, a mobile platform in the form of a passenger aircraft equipped with a power distribution system according to the present invention is illustrated at reference numeral 10. It will be appreciated, however, that the present invention is not limited to use only in commercial aircraft and can be implemented in any platform, mobile or stationary, such as an automobile, ship, train, bus, motor craft, theatre, stadium, etc.

The aircraft 10 generally includes a fuselage 12, wings 14, and a tail fin 16. The fuselage 12 includes a passenger cabin 18 having a floor 20. At the floor 20 are numerous passenger seats 22. Two more passenger seats 22 are grouped together as a seat group 24. One or more seat tracks 26 extend along the floor 20 to secure the seat groups 24 into position. The seat track 26 is covered by a seat track cover 28, which, as set forth below, contains electrical connectors that extend between the seats 22.

Figure 2:
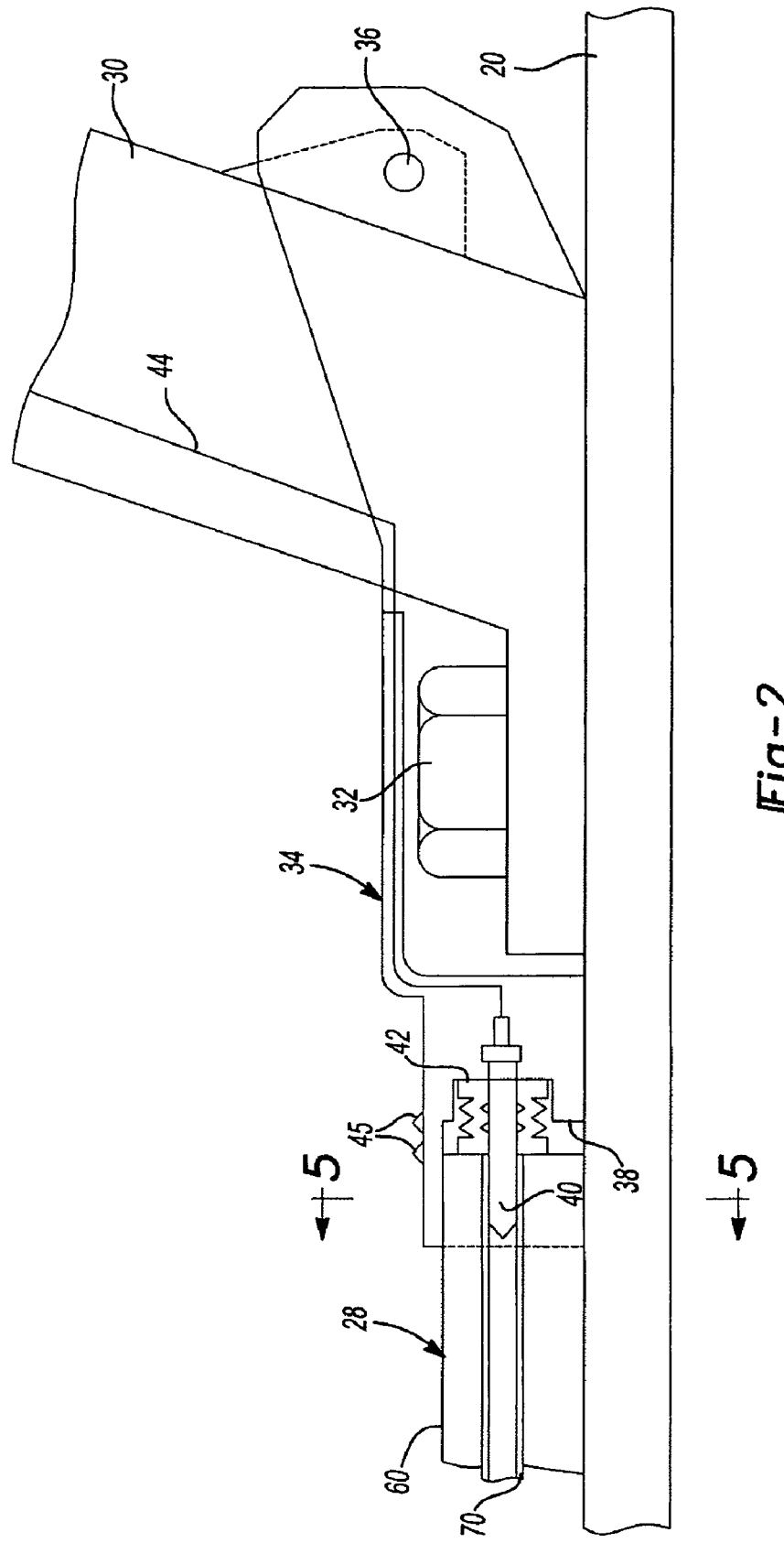
FIG. 2 is a side view of the connection between the seat track cover and a seat leg.

With continued reference to FIG. 1 and additional reference to FIG. 2, the seat groups 24 include at least two legs 30. Each seat leg 30 is secured to the seat track using a suitable fastening device, such as a bolt 32. Secured to one or more of the legs 30 is a seat foot 34. The seat foot 34 is secured to the seat leg 30 in any suitable manner, such as by using a bolt 36 to permit rotation of the foot 34 between an operable position (FIG. 2) and a transport or inoperable position (not shown) in which the foot 34 is rotated upward away from the track 26 where it is at least substantially aligned with the seat leg 30. The foot 34 can also be secured to the leg 30 to permit movement about the leg 30 in any number of various other directions.

Figure 3:
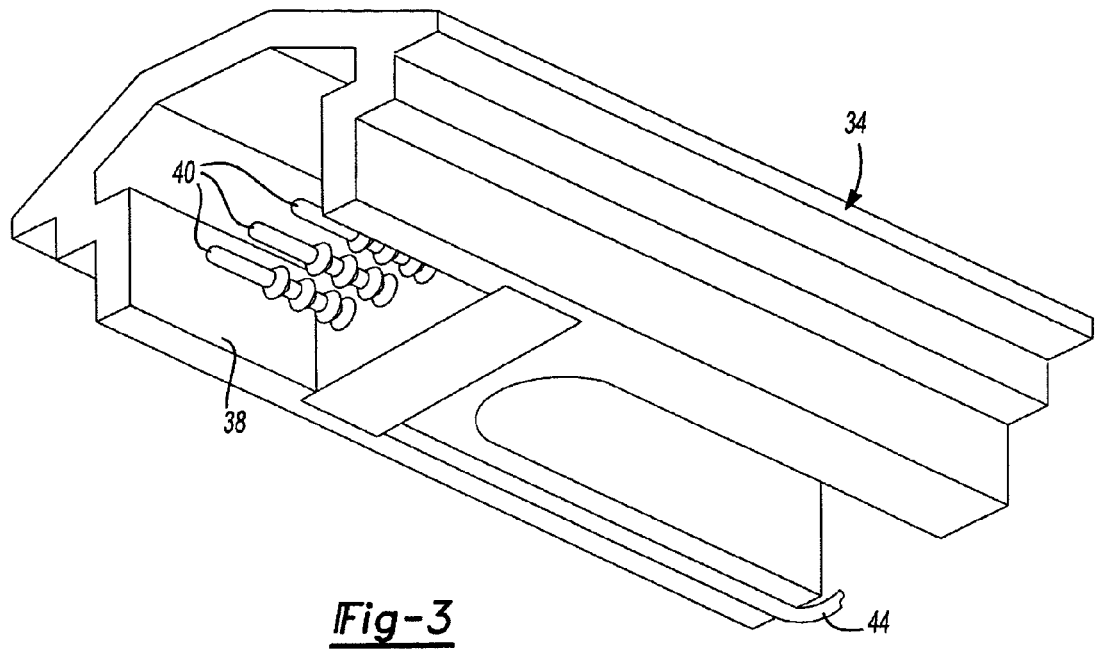
FIG. 3 is a perspective view of an end portion of a connector foot.

With additional reference to FIG. 3, the foot 34 generally includes a receptacle 38 at the end of the foot 34 for receiving the seat track cover 28. Within the receptacle 38 is at least one conductor member, which can comprise a conductor pin 40. The conductor pin 40 is at least partially secured within the receptacle 38 by a gasket or a boot 42. The pin 40 can be used to conduct electricity between one or more wires 44 that extend through the foot 34, up the seat leg 30, and to the seats 22 to deliver electricity and/or data to the seats 22. The boot 42 can be made of any suitable material operable to create a moisture resistant seal around the pin 40. At the boot 34 near the pin 40 are reference marks 45 on an exterior surface of the foot 34. These reference marks 45 are positioned on the foot 34 such that when a seat track cover 28 is cut to length, it can be positioned between adjacent seat legs 30 and, if the ends of the seat track cover 28 are within the reference marks 45 of both seat feet 34, the pins 40 will be engaged in the tube assemblies 70, discussed further below. The receptacle 38 can further include one or more guide rods (not shown) to guide the cover 28 into cooperation with the receptacle 38.

Figure 4A:
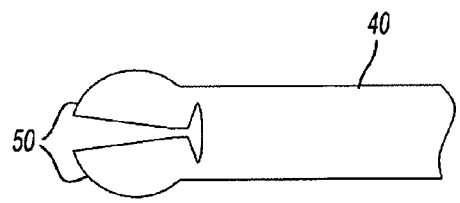
FIG. 4A is a side view of a connector pin having a first engagement feature.
Figure 4B:
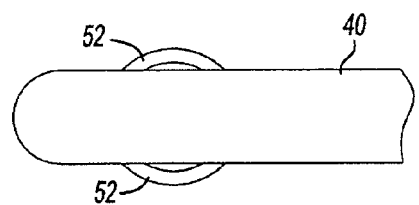
FIG. 4B is a side view of a connector pin having a second engagement feature.

With additional reference to FIG. 4, the pin 40 can be any suitable conductive device, such as a banana plug having spring-like features 50 formed within the pin 40 (FIG. 4A). Further, the pin 40 can include conductive springs 52 secured to the pin 40 (FIG. 4B), such as by rivets (not shown).

Figure 5:
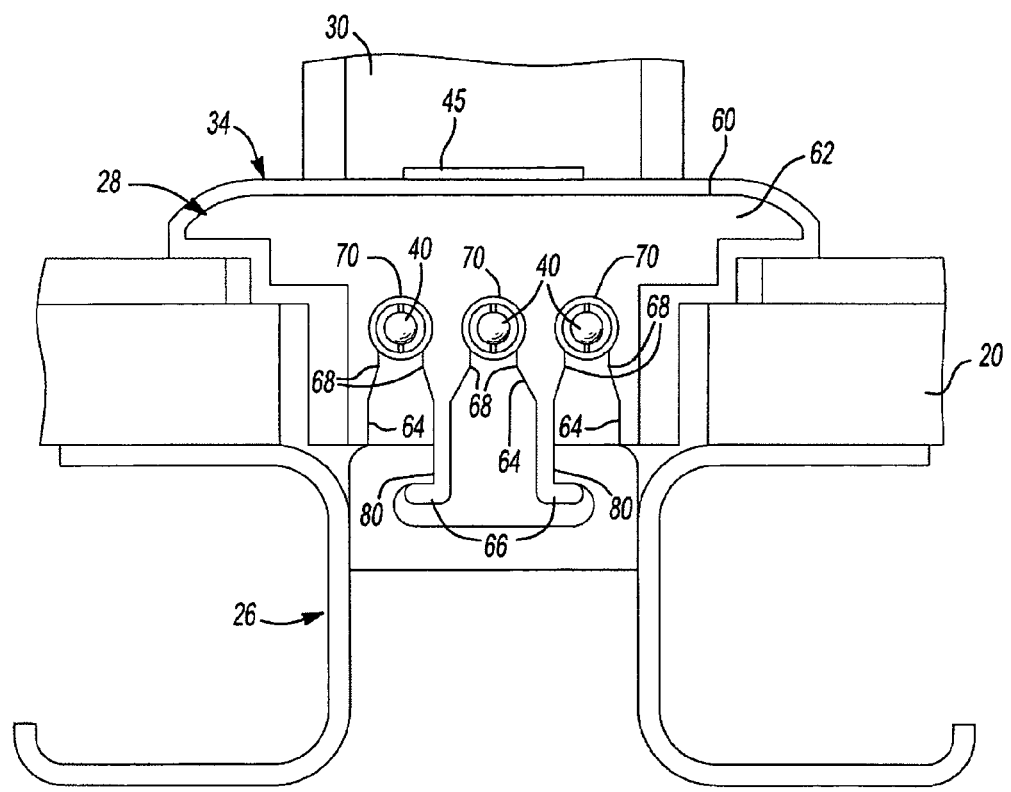
FIG. 5 is a cross-sectional view taken along line 5—5 of FIG. 2.
Figure 6A:
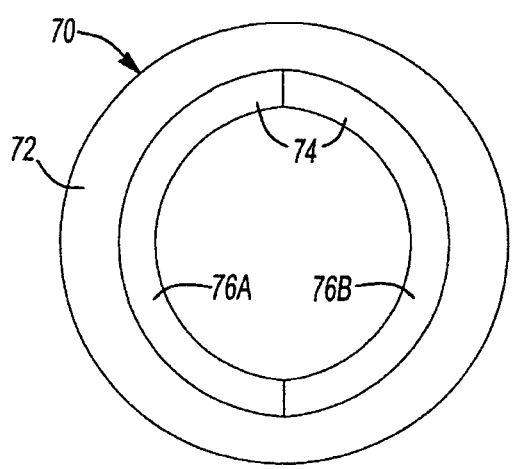
FIGS. 6A through 6D are cross-sectional views of various different embodiments of conduit assemblies of the present invention.
Figure 6B:
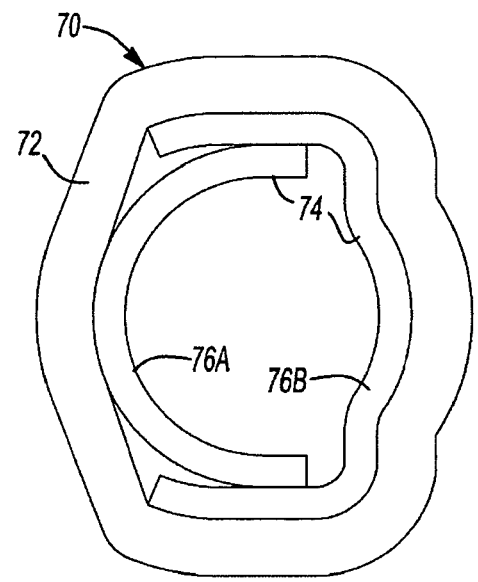
Figure 6C:
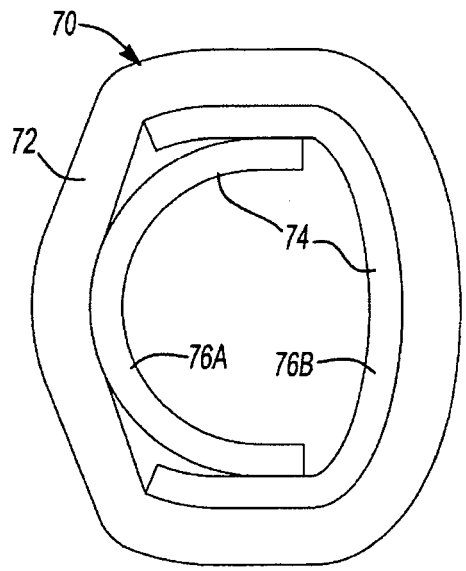
Figure 6D:
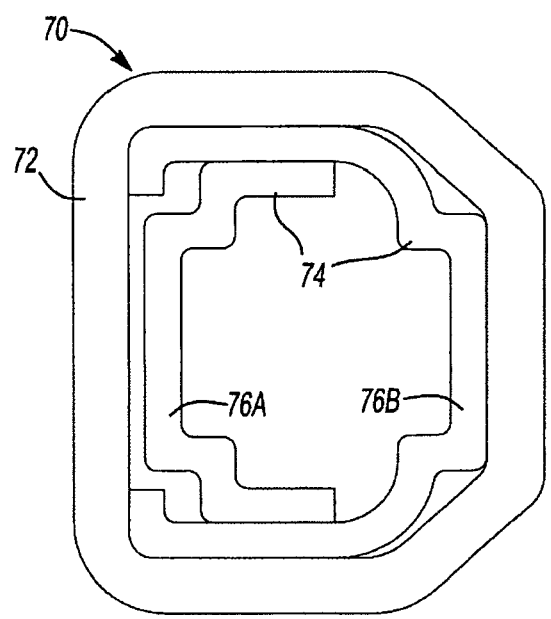

With additional reference to FIG. 5, the cover 28 generally includes a top portion 60, a body 62, receivers 64 formed within the body 62 and a locking clamp 66. The receivers 64 are generally circular and include locking details 68. The cover 28 can be made from any resilient polymeric material, such as plastic.

With additional reference to FIG. 6, the cover 28 further includes one or more conductive conduits or tube assemblies 70 that extend through one or more of the receivers 64 of the body 62. The tube assembly 70 generally includes a dielectric outer layer 72 and a conductive inner layer 74. The outer layer 72 is typically a waterproof, stretched elastic material or electrical shrink wrap. The inner layer 74 is any suitable conductive material, such as copper. The inner layer 74 can be solid or have at least two sections: a first section 76A and a second section 76B. The elastic outer layer 72 applies pressure to the two sections 76A and 76B to maintain the two sections 76A and 76B in a contracted position to decrease the inner circumference of the inner layer 74. The shape and configuration of the outer layer 72 and the inner layer 74 can vary depending on the application. FIGS. 6A through 6D illustrate a plurality of different configurations that can be used.

Again referring to FIG. 5, the tube assembly 70 is seated within the body 62 of the cover 28. Specifically, the tube assembly 70 is inserted within the receivers 64 and is secured within the receivers by the locking details 68. The tube assembly 70 extends through approximately the entire length of the cover 28. While three tube assemblies 70 and three receivers 64 are illustrated, virtually any number of tube assemblies 70 and receivers 64 can be provided depending upon the application.

The assembly and operation of one preferred embodiment of the present invention will now be described in detail. As illustrated in FIGS. 1 and 2, any number of seat groups 24 are secured to the seat track 26 by a suitable fastening device, such as the bolt 32. The foot 34 is secured to the legs 30 of any number of seat groups to provide connections to internal wiring 44 of the seat groups 24. The wiring 44 can be connected to, for example, a power outlet or in-flight entertainment system.

To provide a power/data connection between neighboring seat groups 24 each equipped with the foot 34, the cover 28 outfitted with the tube assembly 70 is inserted at the seat track 26 between the feet 34 of the neighboring seat groups 24. Specifically, the cover 28 is pre-cut such that it has a length equal to the distance between the feet 34 of neighboring seat groups 24 desired by the operator of the aircraft 10. The reference marks 45, which indicate the position of the pin 40, provide a guide to ensure that the cover 28 is cut to a proper length. The cover 28 can be wedged or "inch-wormed" over the seat track 26 between the neighboring feet 34 to provide an electrical/data connection between the neighboring seat groups 24. In particular, the cover 28 is positioned so that the pin 40 is inserted within the inner conductive inner layer 74 of the tube assembly 70 and an end portion of the cover 28 is received by the receptacle 38. The pin 40 is locked within the tube assembly 70 by the force exerted by the outer layer 72 upon both the inner layer 74 and the pin 40. The pin 40 is further locked in place through interaction between the spring features 50 and/or the conductive spring 52 of the pin 40. The cover is secured to the seat track 26 through interaction between the locking clamp 66 of the cover 28 and tabs 80 of the seat track 26.

With the cover 28 in position between two seat legs 30, a power/data connection is provided between two seat groups 24. Using numerous covers 28 connected to the feet 34 of numerous different seat groups 24 and at least one cover 28 connected to a power/data source 82, numerous seat groups 24 can be provided with a connection to the data/power source 82.

Figure 7:
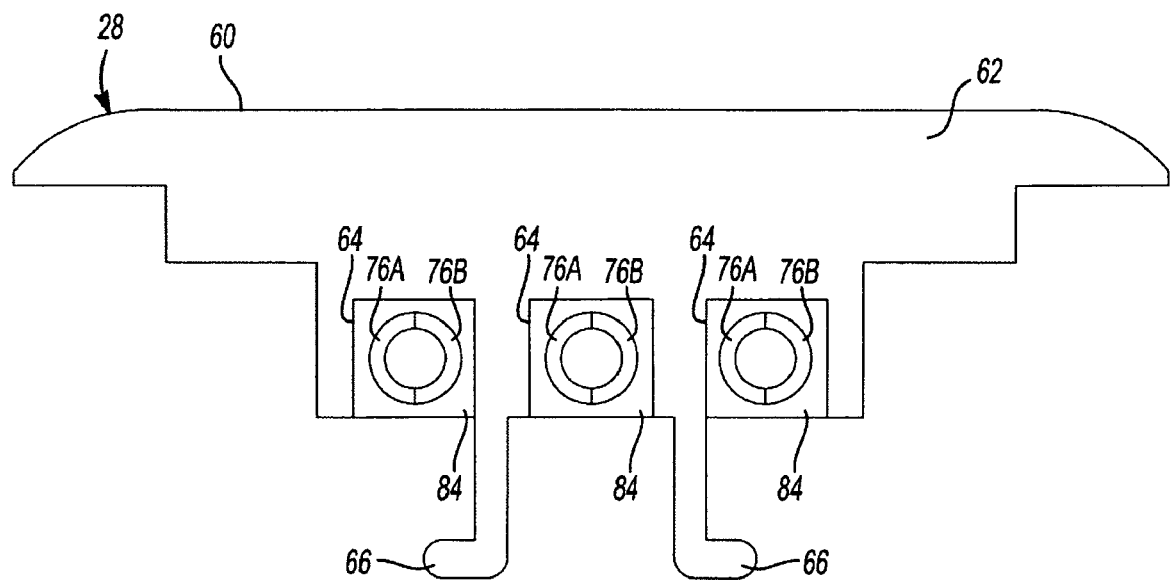
FIG. 7 is a side view of the seat track cover according to an additional embodiment of the present invention.

FIGS. 7 through 9 illustrate an additional embodiment of the present invention. As illustrated, the receivers 64 can be filled with a dielectric 84, such as urethane, that provides elastic and dielectric properties that are similar to the outer layer 72 of the tube assembly 70. It is through this dielectric layer 84 that the conductive inner layer 74 having the first section 76A and the second section 76B extends. To space the layer 74 within the receivers 64, one or more spacer blocks 86 (Figures and 9) can be positioned within the receivers 64 to support the inner layer 74 at various intervals. FIGS. 8A and 8B illustrate two different embodiments of the spacer blocks 86A and 86B having different shapes. In addition to the spacer blocks 86A and 86B, numerous other spacer blocks of various different shapes and configurations can be used. Therefore, the embodiment of FIG. 7 is similar to the embodiments described above except that the dielectric outer layer 72 described above is replaced by the dielectric 84.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A seat track system for conducting current between a first point and a second point of a seat track, said system comprising:
   a conductive tube assembly having:
      a conductive inner layer having a first conductive portion and a second conductive portion that is structurally independent of said first conductive portion, said first and said second portions defining a socket;
      a dielectric outer layer that is elastic so as to exert a biasing force on said conductive inner layer to urge said first portion and said second portion together;
   a housing securable to a seat track and operable to receive said conductive tube assembly and support said tube assembly between said first and said second points;
   wherein said socket is operable to receive a conductive member that mates with said conductive inner layer to conduct current to and from said conductive tube assembly.

2. The system of claim 1, wherein said first and said second conductive portions are copper.

3. The system of claim 1, wherein said member comprises a prong being housed within a connector foot that has a reference mark operable to assist in determining what length of said housing is required.

4. The system of claim 1, wherein said conductive member has an engagement feature to enhance mating with said socket.

5. The system of claim 1, wherein said socket extends an entire length of said conductive tube assembly.

6. The system of claim 1, further comprising spacer blocks to position said conductive inner layer within said dielectric outer layer.

7. The system of claim 1, wherein said housing comprises a seat track cover.

8. The system of claim 7, wherein said first point comprises a first aircraft passenger seat and said second point is at a second aircraft passenger seat.

9. A system for conducting current between seats of a mobile platform comprising:
   a cover operable to extend between a first receptacle of a first seat and a second receptacle of a second seat;
   a conductive tube assembly mounted to said cover and extending at least substantially an entire length of said cover, said conductive tube assembly having:
      a conductive inner layer having a first conductive portion and a second conductive portion that is structurally independent of said first conductive portion, said first and second portions defining a socket;
      a dielectric outer layer that is elastic so as to exert a biasing force on said conductive inner layer to urge said first portion and said second portion together;
   wherein said socket is operable to receive a first conductive member of said first receptacle and a second conductive member of said second receptacle to conduct electricity between said first seat and said second seat.

10. The system of claim 9, wherein said mobile platform comprises an aircraft.

11. The system of claim 9, wherein said cover comprises a seat track cover.

12. The system of claim 9, wherein said first and said second conductive portions are copper.

13. The system of claim 9, wherein at least one of said first conductive member and said second conductive member is housed within a connector foot that has a reference mark operable to assist in determining what length of said housing is required.

14. The system of claim 9, wherein said conductive member comprises a conductive prong having an engagement feature to enhance engagement with said socket.

15. The system of claim 9, wherein said socket extends an entire length of said conductive tube assembly.

16. The system of claim 9, further comprising spacer blocks to position said conductive inner layer within said dielectric outer layer.

17. A method for distributing current between a first seat and a second seat of an aircraft passenger cabin comprising:
  securing a conductive tube assembly within a housing;
  positioning the housing between the first seat and the second seat such that a first end of the conductive tube assembly is at least proximate to the first seat and a second end of the conductive tube assembly is at least proximate to the second seat, the conductive tube assembly having:
    a conductive inner layer having a first conductive portion and a second conductive portion that is structurally independent of the first conductive portion, the first and the second portions defining a socket;
    a dielectric outer layer that is elastic so as to exert a biasing force on the conductive inner layer to urge the first portion and the second portion together;
  inserting a first conductive member of the first seat within the socket at the first end of the conductive tube assembly; and
  inserting a second conductive member of the second seat within the socket at the second end of the conductive tube assembly to provide an electrical connection between the first point and the second point using the conductive tube assembly.

18. The method of claim 17, wherein said positioning step further comprises positioning said conductive inner layer within said dielectric outer layer using a spacer.

19. The method of claim 17, further comprising a step of sizing the conductive tube assembly and the housing to a size sufficient to extend between the first seat and the second seat using a reference mark at each of the first seat and the second seat.

* * * * *